Patented Sept. 6, 1949

2,481,052

UNITED STATES PATENT OFFICE 2,481,052

POLYMERIZATION OF ORGANO-SILOXANES

Earl Leathen Warrick, Pittsburgh, Pa., assignor to Corning Glass Works, Corning, N. Y., a corporation of New York No Drawing. Application October 3, 1944, Serial No. 557,055

10 Claims. (Cl. 260—46.5)

This invention relates to organo-siloxanes and methods of polymerizing them.

Organo-siloxanes are compositions comprising essentially silicon atoms connected to each other by oxygen atoms through silicon-oxygen linkages, thus

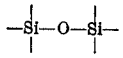

and having organic radicals attached through carbon-silicon linkages to at least some of the silicon atoms. They may be prepared by the hydrolysis of a hydrolyzable organo-silane followed by condensation (partial or complete) of the hydrolysis product. They may also be prepared by hydrolyzing and condensing mixtures of different hydrolyzable organo-silanes, as described in the copending application of James Franklin Hyde, Serial Number 432,528 filed February 26, 1942, and assigned to the assignee of the present invention. In the latter case, hydrolyzable silanes which contain no organic radicals attached to silicon through carbon-silicon linkages, such as silicon tetrachloride or ethyl orthosilicate, may be included with the organo-silanes, if desired. By employing such mixtures of silanes, it is possible to prepare organo-siloxanes which contain on the average up to and including three organic radicals per silicon atom.

Hydrolyzable organo-silanes are derivatives of $SiH_4$, and have the general formula $R_ySiX_{(4-y)}$ where R represents an organic radical attached to silicon through carbon-silicon linkages; X represents a readily hydrolyzable radical selected from the class consisting of halogens, amino groups, alkoxy, aroxy and acyloxy radicals; and $y$ is an integer from 1 to 3. Examples of organic radicals represented by the symbol R are as follows: aliphatic radicals such as methyl, ethyl, propyl, isopropyl, butyl, amyl, hexyl, heptyl to octadecyl and higher, alicyclic radicals such as cyclopentyl, cyclohexyl, etc.; aryl and alkaryl radicals such as phenyl, mono- and poly-alkyl phenyl as tolyl, xylyl, mesityl, mono-, di-, and tri-ethyl phenyls, mono-, di-, and tri-propyl phenyls, etc., naphthyl, mono- and poly-alkyl naphthyls, as methyl naphthyl, diethyl naphthyls, tri-propyl naphthyls, etc.; tetra-hydronaphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc.

Hydrolysis of the above silanes or mixtures thereof is generally accompanied by condensation of the intermediately formed hydroxy compounds to form siloxane linkages, thus,

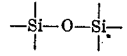

The formation of a siloxane linkage generally results from the close approach of two hydroxyl groups and subsequent elimination of water. It may also result from the close approach of one hydroxyl group to a hydrolyzable group such as halogen, acyloxy, or alkoxy, etc., and subsequent elimination of hydrogen halide, carboxylic acid or alcohol, respectively. Such eliminations are catalyzed by mineral acids, especially hydrochloric and sulphuric, and by alkali metal hydroxides, especially sodium hydroxide. As a result of the hydrolysis and condensation, organo-siloxanes are produced which are partially or completely condensed and which have on the average up to and including three organic radicals attached to each silicon atoms. The organo-siloxanes, as previously mentioned, consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as halogens, alkoxy, etc., listed above as the hydrolyzable radicals.

The organo-siloxanes resulting from the hydrolysis of organo-silanes are generally, in the absence of further treatment, materials of low molecular weights. Heating at elevated temperatures will cause further condensation of the hydrolysis products which contain a substantial amount of hydroxyl radicals, that is, those which are only partially condensed, thereby producing either liquids of higher viscosity or solids. However, organo-siloxanes which are substantially free of condensable hydroxyl radicals, that is, those which are completely condensed or substantially so, are resistant to heat alone. In general organo-siloxanes having on the average more than about 1.75 organic radicals per silicon atom are particularly resistant to further polymerization by heat, requiring many hours at elevated temperatures to produce any substantial change, and, in many instances, undergoing no change at all.

It has been found that both the partially and completely condensed organo-siloxanes yield valuable products when polymerized to higher molecular weight compositions. The liquids, particularly the completely condensed ones, are adapted to be used in damping fluid or actuating fluid applications which require high viscosity liquids of great stability. The resinous solids, in thin sections, particularly those having more than 1.6 organic radicals per silicon atom, possess great flexibility and strength. Various catalysts have been found effective in accelerating polymerization to high molecular weight materials. However, in general, even with the help of these polymerization catalysts, such as alkali and acid, polymerization to the desired stage has required an undue length of time and extremely high temperature, particularly in the case of the substantially completely condensed siloxanes. Accordingly it would be desirable to provide an agent which would aid in accomplishing the polymerization of organo-siloxanes at relatively low temperatures and which would substantially reduce the time required to effect the desired polymerization.

One of the objects of this invention is to provide a new method of polymerizing organo-siloxanes.

Another object of the present invention is to provide methods of preparing new synthetic compositions from organo-siloxanes.

Another object of this invention is to provide new synthetic compositions comprising organo-siloxanes.

More specifically, it is an object of this invention to react either partially or completely condensed organo-siloxanes with a peroxide containing an aromatic acyl radical and to recover the reaction products.

In accordance with my invention I have discovered that organo-siloxanes whose organic substituents consist essentially of hydrocarbon radicals attached to silicon through carbon-silicon linkages, and at least some of which are alkyl radicals, can be polymerized by treatment with aromatic acyl peroxides under conditions which promote the reaction of the peroxides with the siloxanes. By my method, polymerization can be accomplished at relatively low temperatures and in relatively short time as contrasted with known polymerization agents. Furthermore, products can be obtained having properties not hitherto obtainable with other agents.

The products of the polymerization may be liquids, gels, resinous solids, or rubbery compositions depending upon the amount of peroxide employed, the time the reaction is allowed to continue, and the degree of organo-substitution of the starting siloxane. In general, the low viscosity liquids may be converted by my method to higher viscosity liquids to render them more suitable for particular applications in the field of damping or actuating fluids. The liquids may also be polymerized to solids which are suitable as electrically insulating coatings for metallic conductors and for electrically insulating textile fabrics such as glass fibre tape. The low molecular weight organo-siloxanes, containing on the average between 1.75 and 2.25 organic radicals per silicon atom can be converted by treatment with aromatic acyl peroxides to higher molecular weight liquids; or if the treatment is continued sufficiently long they can be converted to gels that yield compressible and elastic molded products of high heat stability when treated with more peroxide as described and claimed in my copending application Serial No. 557,056 entitled "Organo-silicon compositions and methods of making them," filed on even date herewith and now Patent No. 2,460,795.

My new method may be practiced generally in the following manner. The organo-siloxane to be treated is thoroughly mixed with a small amount of an aromatic acyl peroxide, preferably not more than 5% by weight of the siloxane at any one time. The mixture is then heated at a temperature sufficiently above the decomposition temperature of the peroxide to produce a reasonably rapid but controllable rate of reaction of the peroxide with the siloxane. It is preferable to use the peroxide mixed with some inert filler such as calcium sulphate in order to reduce the reactivity of the peroxide which in most instances is so reactive as to render its use in the pure condition hazardous. It is also desirable not to use too much peroxide at one time since the products of decomposition of the peroxide will be produced so rapidly as to cause foaming. This may be avoided by successive additions of extremely small portions of the peroxide. The extent of the polymerization may be controlled by varying the amount of peroxide used. The polymerization may also be discontinued by lowering the reaction temperature to the point where reaction ceases and then removing any unreacted peroxide by suitable means as by treatment with a reducing agent or by passing oxygen through the liquid.

I prefer to carry out the reaction of the aromatic acyl peroxide with the organo-siloxane in the substantial absence of oxygen since the latter in some manner not completely understood reduces the effectiveness of the peroxide. Where a large amount of liquid is treated in the peroxide, that portion below the surface will react and increase in viscosity but the surface remains substantially unaffected. If a relatively thin section of the siloxane is being treated, it is essential that oxygen be excluded for complete reaction to occur. The exclusion of oxygen may be effected by carrying out the reaction under reduced pressure, or by use of an inert atmosphere such as $CO_2$, or by any other suitable method.

If the organo-siloxane to be treated is not initially a liquid at the temperature of reaction but is a solid it may be handled in one of two ways. If it is soluble in a solvent boiling above the reaction temperature and the solvent is chemically inert as well as able to dissolve the peroxide, then such solvent may be employed as the reaction medium. Or the solid, whether soluble or insoluble, may be thoroughly milled with the requisite amount of peroxide and then heated to reaction temperature.

Among the aromatic acyl peroxides which I have found to be effective in carrying out the method of my invention are the following: benzoyl peroxide, benzoyl acetyl peroxide, dinaphthoylperoxide, benzoyl lauroyl peroxide, etc. In general any acyl peroxide which contains at least one aromatic acyl radical is operative in practicing my invention. The acyl radical may contain inorganic substituents such as halogen, nitro groups, etc.

The mechanism of the reaction between the alkyl siloxanes and acyl peroxide is not clearly understood. In the case of benzoyl peroxide, benzoic acid is a by-product of the reaction. The reason for oxygen impairing the effectiveness of the peroxide is likewise not known. Whatever the particular mechanism is, it is clear that the peroxide causes molecules of the siloxane to link together to produce molecules of higher molecular weight and greater viscosity.

For a better understanding of my invention reference should be had to the following examples.

EXAMPLE 1

A dimethyl silicone of 8,500 c. s. viscosity was prepared by the hydrolysis of dimethyldiethoxysilane in the presence of 85% sulphuric acid as a catalyst. This polymer was heated with different amounts of benzoyl peroxide at 125° C. for different times. The resulting data are collected in Table I.

*Table I*

| Per Cent Peroxide | Viscosity | | | Treatment | |
|---|---|---|---|---|---|
| | Initial | Final | Per Cent Increase | Time (Hrs.) | Temp., °C. |
| 0 | 8,500 | 9,750 | 15 | 2 | 125 |
| | 8,500 | 11,250 | 32 | 17 | 125 |
| 0.1 | 8,500 | 11,538 | 39 | 2 | 125 |
| | 8,500 | 12,700 | 49.5 | 17 | 125 |
| 0.5 | 8,500 | 24,000 | 160 | 2 | 125 |
| | 8,500 | 38,000 | 347 | 17 | 125 |
| 1.0 | 8,500 | gel | | 2 | 125 |

EXAMPLE 2

Diethyl silicone was prepared by the hydrolysis of diethyldichlorosilane. It was then treated with solid sodium hydroxide in such amount that the ratio of the number of silicon atoms in the silicone to the number of sodium hydroxide molecules was 100 to 1. The final product was neutralized with $CO_2$, leaving a liquid which had a viscosity of 625 centistokes. This liquid was treated with benzoyl peroxide in successive additions of 2% each until a total of 6% was reached, each addition being made at the end of 17 hours of heating at 125° C. The data obtained are tabulated in Table II.

*Table II*

| Benzoyl Peroxide | Viscosity (Centistokes) | |
|---|---|---|
| | Initial | Final |
| 0 per cent | 625 | 712 |
| 2 per cent | 712 | 1,690 |
| 4 per cent | 1,690 | 3,530 |
| 6 per cent | 3,530 | gel |

It was found that where the starting liquid is of low viscosity the benzoyl peroxide is not easily maintained in suspension so that better results are obtained if the liquid is subjected to repeated treatments with the peroxide as indicated in the above table.

EXAMPLE 3

A methyl siloxane copolymer was prepared by hydrolyzing a mixture of 90 mol per cent dimethyldiethoxysilane and 10 mol per cent of methyltriethoxysilane with aqueous hydrochloric acid and recovering the oily product which had a viscosity of 133 centistokes. This liquid was mixed with 2% by weight of benzoyl peroxide and heated at 125° C. for 17 hours. Its viscosity increased to 300 centistokes. Four more per cent of benzoyl peroxide was then added and the heating continued at 125° C. for 17 hours. The product was a gel. An untreated sample when subjected to the same heating schedule remained substantially unchanged.

EXAMPLE 4

A methyl siloxane copolymer was prepared in the following manner. Hexamethyldisiloxane dissolved in concentrated sulphuric acid was added with stirring to dimethylsilicone of 300 centistokes viscosity. The stirring was continued for 30 minutes. Excess water was then added. The mixture was allowed to stand for one hour and was then washed in benzene solution to completely remove acid. The solution was freed of benzene and low polymers by distillation up to 230° C. The product's viscosity was 55 centistokes. This liquid was then subjected to repeated treatments with benzoyl peroxide with the results shown in the following table.

*Table III*

| Benzoyl Peroxide | Viscosity (Centistokes) | | Treatment | |
|---|---|---|---|---|
| | Initial | Final | Time (Hrs.) | Temp., °C. |
| 0 percent | 55 | 55 | 47 | 125 |
| 2 percent | 55 | 72 | 17 | 125 |
| 4 percent | 72 | 132 | 17 | 125 |
| 6 percent | 132 | gel | 17 | 125 |

EXAMPLE 5

The cyclic tetramer of phenyl methyl silicone (tetramethyltetraphenylcyclotetrasiloxane) was treated with different amounts of benzoyl peroxide at 125° C. The results are collected in the following table along with those obtained by heating some of the silicone without peroxide at 125° C.

*Table IV*

| Peroxide, Per Cent | Time (Hrs.) | Viscosity (Centistokes) | | |
|---|---|---|---|---|
| | | Initial | Final | Per Cent Increase |
| 0 | 18 | 146 | 153 | |
| 0 | 17 | 153 | 144 | |
| 0 | 18 | 144 | 153 | |
| 5.6 | 18 | 146 | 310 | 112 |
| 8.8 | 17 | 310 | 750 | 142 |
| 9.3 | 18 | 750 | 2,250 | 200 |

I have found that, in general, those siloxanes which contain aryl as well as alkyl radicals require more peroxide than the alkyl siloxanes. The reason for this is not clear at present. However, if sufficient peroxide is added, a rubbery gel can be finally obtained.

EXAMPLE 6

The cyclic trimer of phenyl ethyl silicone (triethyltriphenylcyclotrisiloxane) was treated with different amounts of benzoyl peroxide at 125° C. The data obtained are tabulated in the following table along with those obtained with blank examples.

*Table V*

| Peroxide, Per Cent | Time (Hrs.) | Viscosity (Centistokes) | | |
|---|---|---|---|---|
| | | Initial | Final | Per cent Increase |
| 0 | 18 | 59.2 | 65 | |
| 0 | 17 | 65 | 61 | |
| 0 | 18 | 61 | 47.5 | |
| 6.1 | 18 | 59.2 | 110.0 | 85 |
| 8.1 | 17 | 110 | 251 | 128 |
| 8.1 | 18 | 251 | 625 | 148 |

EXAMPLE 7

Octadecamethyloctasiloxane, 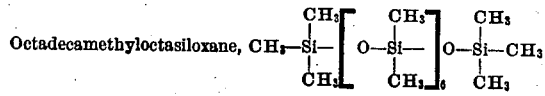

was prepared by hydrolyzing equimolar quantities of dimethyldiethoxysilane and trimethylethoxysilane and fractionally distilling the hydrolysis product to recover the above siloxane boiling at 102° C. at 5 mm. Samples of this material were treated with different amounts of benzoyl peroxide at 125° C. The data obtained are tabulated in the following table along with those obtained with blank samples.

*Table VI*

| Peroxide, Per Cent | Time (Hrs.) | Viscosity (Centistokes) | | |
|---|---|---|---|---|
| | | Initial | Final | Per cent Increase |
| 0 | 18 | 3.6 | 3.6 | |
| 0 | 17 | 3.6 | 3.6 | |
| 0 | 18 | 3.6 | 3.6 | |
| 5.9 | 18 | 3.6 | 4.0 | 11 |
| 9.0 | 17 | 4.0 | 5.4 | 35 |
| 8.7 | 18 | 5.4 | 6.6 | 22 |

The relatively small increase in viscosity obtained in the case of the above siloxanes is due to the small size of the starting molecules. To obtain a large increase in viscosity large amounts of peroxide are required.

EXAMPLE 8

A liquid phenyl methyl siloxane was prepared in the following manner. 1.05 mols of phenyl bromide and 1.05 mols of methyl chloride were reacted simultaneously with magnesium. The resultant Grignard was then coupled with silicon tetrachloride to yield a degree of substitution of 2.1. The product was hydrolyzed by adding a large excess of water. An oil was recovered which was heated to 275° C. at 15 mm. and 8% volatiles distilled off, leaving a liquid with a viscosity of 2100 centistokes. This liquid was treated with benzoyl peroxide at 125° C. The data obtained are tabulated in the following table along with those obtained with a blank sample.

*Table VII*

| Peroxide, Per Cent | Time (Hrs.) | Viscosity (Centistokes) | | |
|---|---|---|---|---|
| | | Initial | Final | Per cent Increase |
| 0 | 18 | 2,100 | 4,200 | 100 |
| 1.53 | 18 | 2,100 | 5,450 | 160 |

EXAMPLE 9

A liquid phenyl ethyl siloxane (prepared in a manner similar to that described in Example 8) was treated with benzoyl peroxide at 125° C. The data obtained are tabulated in the following table along with those obtained with a blank sample.

*Table VIII*

| Peroxide, Per Cent | Time (Hrs.) | Viscosity (Centistokes) | | |
|---|---|---|---|---|
| | | Initial | Final | Per cent Increase |
| 0 | 18 | 1,180 | 13,500 | 1,040 |
| 6.1 | 18 | 1,180 | 21,000 | 1,680 |

In this example and the preceding example, it will be observed that a substantial increase in viscosity was obtained by heating alone owing to the hydroxyl groups present and to oxidation of the alkyl radicals. It will also be noted that the use of benzoyl peroxide resulted in a larger increase in viscosity.

EXAMPLE 10

A mixture of 50 mol per cent ethyl silicate and trimethylethoxysilane was dropped into a 50 per cent solution of 1N sulphuric acid and in alcohol and refluxed for 3 hours. Another 20 mol per cent of trimethylethoxysilane was then added and refluxing continued for 2 hours. The reaction product was washed with water leaving an oil from which low polymers were removed by distillation up to 230° C. in a $CO_2$ atmosphere. The resulting material was a tacky thermoplastic resin which became higher melting when mixed with different amounts of benzoyl peroxide and heated at 150° C. The data are tabulated in the following table.

*Table IX*

| Peroxide, Per Cent | Time (Hrs.) | Temp., °C. | Melting Point |
|---|---|---|---|
| | | | °C. |
| 0 | 0 | | below 25 |
| 0 | 17 | 150 | 40–70 |
| 2 | 17 | 150 | 58–85 |
| 5 | 17 | 150 | 62–109 |
| 10 | 17 | 150 | 80–132 |

EXAMPLE 11

It has already been mentioned that the treatment of the alkyl containing siloxanes with aromatic acyl peroxides is preferably carried out above the thermal decomposition temperature of the peroxide. The literature reports the decomposition temperature of benzoyl peroxide as 110° C. The following table shows the effect of temperature and amount of benzoyl peroxide on the increase in viscosity of a dimethyl siloxane of 450 centistokes.

*Table X*

| Peroxide, Per Cent | Temp. | Time | Viscosity Increase |
|---|---|---|---|
| | °C. | Min. | Per cent |
| 0.36 | 100 | 40 | 0 |
| 1.39 | 100 | 40 | 8.6 |
| 0.31 | 125 | 40 | 22.4 |
| 0.86 | 125 | 40 | 34.2 |
| 0.29 | 150 | 40 | 53.7 |
| 0.62 | 150 | 40 | 47.0 |
| 0.93 | 150 | 40 | 47.2 |
| 0.93 | 150 | 960 | 100.0 |

It is apparent from the above table that even at 100° C. some decomposition of the peroxide takes place. However, the decomposition rate increases between 100 and 150° C. to such a point that the increase in viscosity of the siloxane for a given time is relatively independent of the amount of peroxide used so long as there is sufficient peroxide to continue the reaction.

EXAMPLE 12

Liquid dimethyl silicone having a viscosity of 1,000 centistokes was prepared by refluxing a mixture of two volumes of dimethyldiethoxysilane, one volume of 95% ethyl alcohol and one volume of hydrochloric acid for four hours, washing the product, drying the oily liquid formed and then distilling up to 250° C. at 0.5 mm. to remove low polymers. The undistilled portion of the liquid was then thoroughly mixed with about three per cent by weight of benzoyl peroxide in the form of "luperco A" which consists of about 23% by weight of benzoyl peroxide precipitated on calcium sulfate. The resulting mixture was heated at 150° C. for two hours whereupon a gel was formed which was quite elastic and tacky and which was insoluble in benzene. This gel was then milled with about 25 parts by weight of alkali-free asbestos and three parts by weight of benzoyl peroxide. The product had the consistency of dough. It was then poured into a mold from which oxygen was excluded. The mold and contents were heated for about ½ hour at 150° C. At the end of this time the contents of the mold had set to a non-tacky coherent rubbery solid. Similar products were obtained with other fillers than asbestos, such as clay, aerogel, fiberglass, floc, iron oxide, bentonite, alumina, zinc oxide, magnesia, lead oxide, titania, and others. These products, in general, exhibited unusual and unexpected rubbery characteristics as well as high heat resistance. Their preparation and properties are described more fully in my copending application, mentioned above, wherein they are specifically claimed.

In general I have found that treatment of organo-siloxanes having on the average less than 1.75 organic radicals per silicon atom such as methyl or ethyl silicic acid with an aromatic acyl peroxide according to my method results first in a more viscous liquid and upon continued treatment in a resinous solid. When the degree of organo-substitution is between 1.75 and 2.25, treatment with the peroxide produces first more viscous liquids and upon continued treatment gels and finally rubbery heat resistant solids of excellent electrical characteristics. Treatment of organo-siloxanes whose degree of substitution is above 2.25 results in products which are generally liquids or thermoplastic solids.

From the preceding description it will be apparent that I have provided a new method of polymerizing either partially or completely dehydrated organo-siloxanes which contain alkyl radicals attached directly to silicon through carbon-silicon linkages. Of the class of organo-siloxanes previously mentioned as being included in my invention, the following have been found outstanding because of the unusual heat stability of the products obtained therefrom, lower alkyl siloxanes, such as methyl, ethyl, propyl, butyl, etc.; phenyl alkyl siloxanes, such as phenyl methyl, phenyl ethyl, hexaorganodisiloxanes, such as hexamethyldisiloxane, etc.

I claim:
1. The method which comprises heating a liquid organo-siloxane having between 1.5 and 2.25 organic radicals per silicon, with 0.1 to 10 per cent by weight based on the siloxane of a diacyl peroxide containing at least one aromatic acyl radical, at a temperature above the decomposition temperature of the peroxide until an increase in viscosity of the siloxane is obtained, the organic substituents of said siloxane being selected from the group consisting of alkyl and aryl radicals.

2. The method according to claim 1 wherein the heating is thereafter continued until a gel insoluble in benzene is obtained.

3. The method in accordance with claim 1 wherein the heating is carried out in the absence of oxygen.

4. The method in accordance with claim 1 wherein the organic substituents are methyl radicals.

5. The method in accordance with claim 1 wherein the organic substituents are methyl and phenyl radicals.

6. The method in accordance with claim 1 wherein the organic substituents are methyl and aryl radicals.

7. The method in accordance with claim 1 wherein the aromatic acyl peroxide is benzoyl peroxide and the reaction temperature is above 100° C.

8. The method which comprises heating a liquid organo-siloxane in which the structural units are $(CH_3)_2SiO$ with from 0.1 to 10 per cent by weight based on the siloxane of a diacyl peroxide containing at least one aromatic acyl radical at a temperature above the decomposition temperature of the peroxide until an increase in viscosity of the siloxane is obtained.

9. A method according to claim 8 in which the peroxide is benzoyl peroxide and the reaction temperature is above 100° C.

10. The method according to claim 8 in which heating is continued until a gel insoluble in benzene is obtained.

EARL LEATHEN WARRICK.

REFERENCES CITED

The following references are of record in the file of this patent:

UNITED STATES PATENTS

| Number | Name | Date |
|---|---|---|
| 2,258,218 | Rochow | Sept. 4, 1941 |
| 2,392,713 | Wright et al. | Jan. 8, 1946 |
| 2,420,911 | Roedel | May 20, 1947 |
| 2,448,565 | Wright et al. | Sept. 7, 1948 |
| 2,452,416 | Wright | Oct. 26, 1948 |

FOREIGN PATENTS

| Number | Country | Date |
|---|---|---|
| 113,708 | Australia | Sept. 4, 1941 |

OTHER REFERENCES

Hurd, Journ. Amerc. Chem. Soc., Oct. 1945, vol. 67, pp. 1813 and 1814.